United States Patent
Narayan et al.

(10) Patent No.: US 10,396,778 B1
(45) Date of Patent: Aug. 27, 2019

(54) METHOD FOR POWER GATING FOR WIDE DYNAMIC VOLTAGE RANGE OPERATION

(71) Applicant: Apple Inc., Cupertino, CA (US)

(72) Inventors: Sambasivan Narayan, Cupertino, CA (US); Suparn Vats, Fremont, CA (US); Sangeetha Mani, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/609,687

(22) Filed: May 31, 2017

(51) Int. Cl.
| | |
|---|---|
| *H03K 19/003* | (2006.01) |
| *H03K 19/00* | (2006.01) |
| *H03K 19/20* | (2006.01) |
| *G11C 5/14* | (2006.01) |
| *H03K 19/23* | (2006.01) |
| *G11C 11/413* | (2006.01) |
| *G06F 17/50* | (2006.01) |
| *H03K 17/687* | (2006.01) |

(52) U.S. Cl.
CPC ....... *H03K 17/6871* (2013.01); *G06F 17/505* (2013.01); *G06F 2217/78* (2013.01)

(58) Field of Classification Search
CPC .... H03K 17/6871; H03K 19/00; H03K 19/23; H03K 19/096; G06F 17/505; G06F 2217/78; G11C 5/14
USPC ............................. 327/365–508; 326/21–98
See application file for complete search history.

(56) References Cited

U.S. PATENT DOCUMENTS

| | | | |
|---|---|---|---|
| 6,433,584 B1 * | 8/2002 | Hatae ................. | H03K 19/0016 326/38 |
| 7,532,036 B2 * | 5/2009 | Fujikawa ........... | H03K 19/0016 326/33 |
| 8,026,741 B2 | 9/2011 | Takayanagi | |
| 8,362,805 B2 * | 1/2013 | Suzuki ............... | H03K 19/0016 326/21 |
| 8,406,075 B2 * | 3/2013 | Lee ........................ | G11C 11/413 365/226 |
| 8,421,499 B2 * | 4/2013 | Takayanagi ........ | H03K 19/0016 326/33 |
| 8,423,946 B1 * | 4/2013 | Jin ....................... | G06F 17/5045 716/126 |
| 8,519,772 B2 | 8/2013 | Chu | |
| 9,564,898 B2 * | 2/2017 | Suzuki ............... | H03K 19/0016 |
| 2010/0097101 A1 | 4/2010 | Chua-Eoan | |
| 2011/0025375 A1 * | 2/2011 | Takayanagi ........ | H03K 19/0013 326/36 |
| 2015/0145555 A1 * | 5/2015 | Koog ................. | H03K 17/161 326/21 |

* cited by examiner

*Primary Examiner* — Brandon S Cole
(74) *Attorney, Agent, or Firm* — Meyertons, Hood, Kivlin, Kowert & Goetzel, P.C.

(57) ABSTRACT

A device is disclosed that includes a circuit block coupled to a local power node, and a power gating circuit coupled between the local power node and a global power supply. In one embodiment, the power gating circuit includes a first plurality of first switching devices with a first threshold voltage, and a second plurality of second switching devices with a second threshold voltage that is different from the first voltage threshold. The power gating circuit may isolate the local power node from the global power supply based on an isolation signal.

20 Claims, 6 Drawing Sheets

METHOD FOR POWER GATING FOR WIDE DYNAMIC VOLTAGE RANGE OPERATION

BACKGROUND

Technical Field

Embodiments described herein are related to the field of integrated circuit implementation, and more particularly to the implementation of power gating circuits.

Description of the Related Art

Some integrated circuits (ICs) utilize power gating to decouple a portion of a circuit from a power supply in order to reduce an amount of current consumed by the IC. Some power gates may utilize one or more transistors or other type of transconductance device as switches to alternatively allow power flow to a circuit by closing the switch or isolating the circuit from the power by opening the switch. A given type of switch design may have a particular set of operating characteristics that may be desirable or undesirable in particular situations. As some ICs may operate over a wide range of conditions, certain types of switch designs may not perform adequately in particular conditions.

SUMMARY OF THE EMBODIMENTS

Various embodiments of power gating circuits are disclosed. Broadly speaking, a system, a method, and an apparatus are contemplated in which the apparatus includes a circuit block coupled to a local power node, and a power gating circuit coupled between the local power node and a global power supply. In one embodiment, the power gating circuit includes a first plurality of first switching devices that have a first threshold voltage, and a second plurality of second switching devices that have a second threshold voltage, different from the first threshold. The power gating circuit may isolate the local power node from the global power supply based on an isolation signal.

In a further embodiment, the second threshold voltage may be greater than the first voltage threshold. In one embodiment, the power gating circuit may be configured to operate when a voltage level of the global power supply is less than the second voltage threshold.

In another embodiment, the first plurality of first switching devices may include at least one p-channel metal-oxide semiconductor field-effect transistor (MOSFET), with a first voltage threshold. The second plurality of the second switching devices may include at least another p-channel MOSFET with a second voltage threshold.

In one embodiment, the first plurality of first switching devices may include at least one p-channel metal-oxide semiconductor field-effect transistors (MOSFET) with a first channel length. The second plurality of second switching devices may include at least another p-channel MOSFET with a second channel length, greater than the first channel length.

In an embodiment, the local power node may be coupled to each of the first plurality of first switching devices and to each of the second plurality of second switching devices using at least one wire in a metal layer of the integrated circuit. In a further embodiment, a number of the second plurality of second switching devices is greater than a number of the first plurality of first switching devices.

BRIEF DESCRIPTION OF THE DRAWINGS

The following detailed description makes reference to the accompanying drawings, which are now briefly described.

Figure 1:
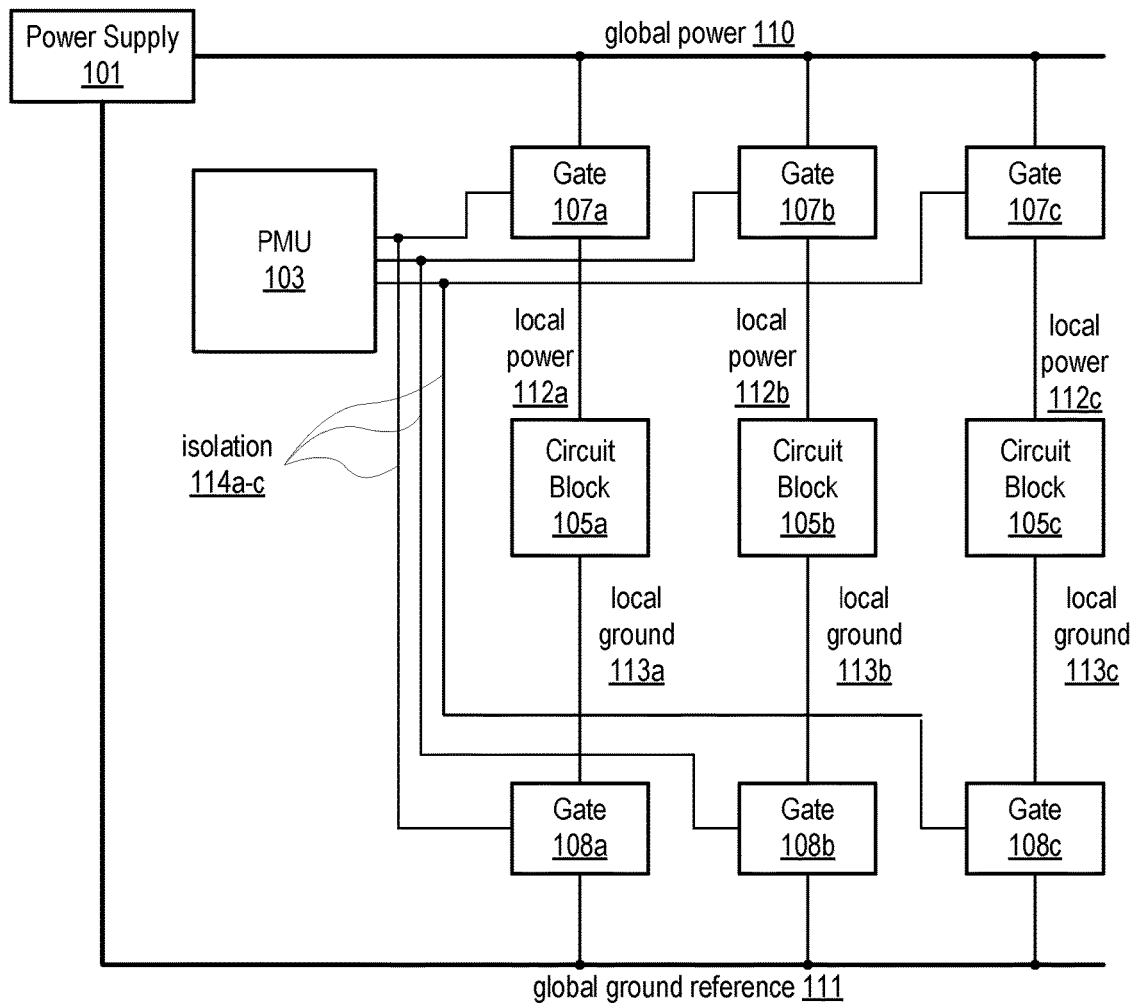
FIG. 1 illustrates an embodiment of a block diagram of power gating scheme for circuit blocks in an integrated circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

An integrated circuit, such as, for example, a system on a chip (SoC), may include one or more circuit blocks, such as, e.g., a processor and one or more memories, which may integrate the function of a computing system onto a single integrated circuit. In some SoC designs, power gating may be utilized to disable one or more circuit blocks from a power signal in order to reduce current consumption when the circuit blocks are not in use.

A power gate design may include one or more transistors, or other type of transconductance device, to act as a switch, allowing power flow to a circuit, or isolating the circuit from the power, based on a control signal of the switch. Various transistor types may have operating characteristics that may be desirable or undesirable under different operating conditions. Certain types of transistors may not perform adequately under some operating conditions (e.g., supply voltage level, operating temperature).

For example, one type of transistor may have desirable leakage characteristics, i.e., the transistor performs well at blocking various forms of leakage current from passing to gated circuits when power to the circuits is disabled via isolation assertion. Such a transistor may, however, not perform well at low operating voltage levels because of a high on resistance ($R_{on}$). A high $R_{on}$ may cause an undesired drop in voltage level across a transistor coupled between a global power supply signal and a local power node signal. Circuits receiving power from the local power node may not, in such cases, receive enough power to function properly. In contrast, another type of transistor may perform across a wide range of voltage levels, but may not perform well at blocking various forms of leakage current from passing to gated circuits when power to the circuits is disabled via isolation assertion.

A power gate design is desired that allows a desired performance level across a wide range of supply voltage levels. Various embodiments of such a power gating circuit are discussed in this disclosure.

Some terms commonly used in reference to IC designs are used in this disclosure. For the sake of clarity, the intended definitions of some of these terms, unless stated otherwise, are as follows.

A Metal-Oxide Semiconductor Field-Effect Transistor (MOSFET) describes a type of transconductive device that may be used in modern digital logic designs. MOSFETs are designed as one of two basic types, n-channel and p-channel. N-channel MOSFETs open a conductive path between the source and drain when a positive voltage greater than the device's voltage threshold is applied between the gate and the source. P-channel MOSFETs open a conductive path when a voltage greater than the device's voltage threshold is applied between the source and the gate.

Complementary MOSFET (CMOS) describes a circuit designed with a mix of n-channel and p-channel MOSFETs. In CMOS designs, n-channel and p-channel MOSFETs may be arranged such that a high level on the gate of a MOSFET turns an n-channel device on, i.e., opens a conductive path, and turns a p-channel MOSFET off, i.e., closes a conductive path. Conversely, a low level on the gate of a MOSFET turns a p-channel on and an n-channel off. In addition, the term transconductance is used in parts of the disclosure. While CMOS logic is used in the examples, it is noted that any suitable digital logic process may be used for the circuits described in this disclosure.

An embodiment of a block diagram of power gating scheme for circuit blocks in an integrated circuit (IC) is illustrated in FIG. 1. In the illustrated embodiment, System 100 includes a Power Supply 101 and Power Management Unit (PMU) 103 both coupled to Power Gates 107a-107c and 108a-108c (collectively referred to as Power Gates, or simply Gates, 107 and 108). Each pair of Gates 107 and 108 is coupled to a respective Circuit Block 105a-105c. Power Supply 101 generates global power signal 110 and global ground reference 111. PMU 103 may assert any combination of isolation signals 114a-114c. Gates 107a-107c may selectively couple or isolate a respective local power signal 112a-112c from global power signal 110 based on a state of isolation signals 114a-114c. In various embodiments, System 100 may be configured for use in a mobile computing application such as, e.g., a tablet computer, a laptop computer, a smartphone, or the like.

Power Supply 101 may correspond to any suitable circuit for generating or distributing a power signal to multiple circuit blocks 105 in system 100. In various embodiments, Power Supply 101 may correspond to a voltage regulator, a voltage rectifier, a battery, or other similar component. Power Supply 101 generates global power signal 110, which provides power to Circuit Blocks 105a-105b. Although three circuit blocks are shown in FIG. 1, in other embodiments any suitable number of circuit blocks may receive power from global power signal 110.

In the illustrated embodiment, PMU 103 controls power distribution to some or all of system 100. PMU 103 may control signals for entering and exiting one or more reduced power modes in System 100. Logic circuits for determining if and when to assert or de-assert isolation signals 114 are included in PMU 103. PMU 103 may assert isolation signals 114 in any suitable combination. Assertion of a given isolation signal 114 causes corresponding Gates 107 and 108 to isolate their respective Circuit Block 105 from global power signal 110, thereby disabling or powering down the respective Circuit Block 105. For example, Circuit Block 105b may correspond to an audio processing circuit. If system 100 is not currently processing any audio signal, then PMU 103 may assert isolation signal 114b causing Gates 107b and 108b to disrupt a flow of current from global power signal 110 to local power signal 112b and from local ground reference 113b to global ground reference 111. In various embodiments, PMU 103 may receive a signal to assert isolation signal 114b or may make a determination to assert isolation signal 114b based on the activity of Circuit Block 105b.

Each of Circuit Blocks 105 may include a plurality of circuit cells, in which a given circuit cell may correspond to a basic logic function, such as, for example, a NAND gate, a NOR, gate, a latch, and the like. Similarly, each of Gates 107 and 108 may include multiple transistors, or other type of transconductance devices. One or more transistors may be used to gate power to a portion of the circuit cells in a particular Circuit Block 105. A particular Gate 107 may include two or more types of transistors or other transconductive devices, such as, for example, different types of p-channel MOSFETS. Similarly, a particular Gate 108 may include or example, two or more types of n-channel MOSFETS. Each type of device may provide certain switching characteristics to the particular Circuit Block 105. For example, a first type of device may provide low $R_{on}$ over a range of operating voltages, while a second type of device may provide low leakage. Additional details of power gates will be presented below.

System 100 shows Gates 107 coupled between a global power signal and a local power node as well as between a local ground reference signal and a global ground reference signal. Other embodiments may be limited to only power gates between the ground reference signals, or to only power gates coupled to power signals.

It is noted that the SoC illustrated in FIG. 1 is merely an example. In other embodiments, different circuit blocks may be included. Some embodiments may include additional global power signals.

Figure 2:
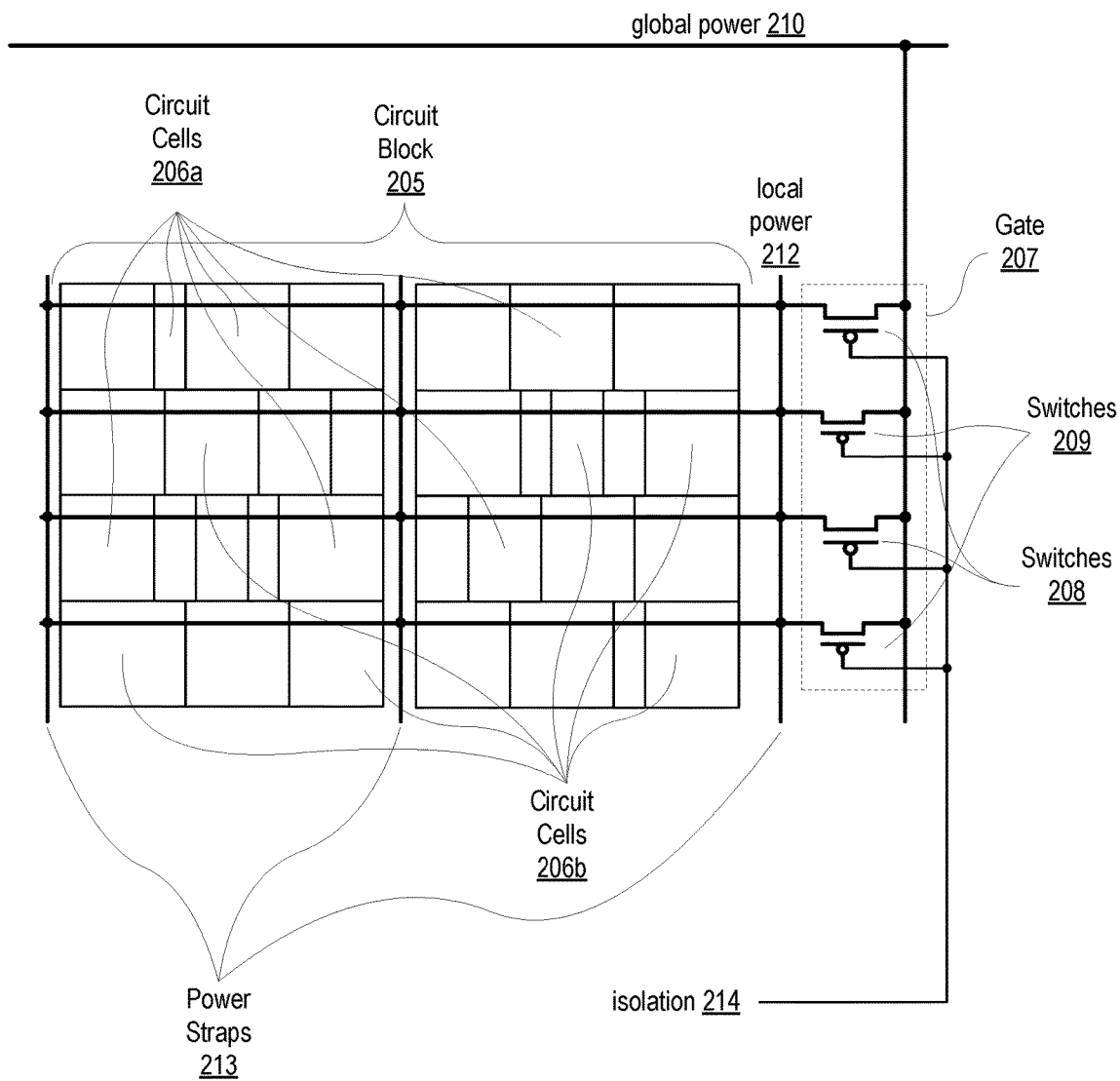
FIG. 2 shows a block diagram for an embodiment of a power gate coupled to a circuit block.

Turning to FIG. 2, an embodiment of a power gate coupled to a circuit block is shown. The illustrated embodiment of system 200 includes Circuit Block 205 and Gate 207. Circuit Block 205 includes a plurality of Circuit Cells 206a and 206b. Gate 207 includes Switches 208 and Switches 209. Gate 207 selectively couples global power signal 210 to local power signal 212 when isolation signal 214 is de-asserted. Various wires may be used conduct local power signal 212 throughout Circuit Cells 206. Power Straps 213 couple the various wires together among Circuit Cells 206.

Circuit Block 205 may correspond to one of Circuit Blocks 105a-105c in FIG. 1. In the illustrated embodiment, various Circuit Cells 206 are coupled together to form circuits of Circuit Block 205, each Circuit Cell 206 performing a given function such as a logic operation, data storage, signal driver, or any suitable function used to perform the functions implemented in Circuit Block 205. Circuit Cells 206 are, in FIG. 2, arranged in rows, with each row in Circuit Cells 206a coupled to a respective wire from a Switch 208 and each row in Circuit Cells 206b coupled to a respective wire from a Switch 209. Power Straps 213 are spaced throughout Circuit Block 205 and used to couple the wires from Switches 208 and Switches 209. For any given task performed by Circuit Block 205 may result in some portions of Circuit Cells 206 consuming more power than other portions of Circuit Cells 206. Power Straps 213 may help to even power distribution to rows of Circuit Cells 206 using more power than other rows.

Although three power straps are shown in FIG. 2, in other embodiments, any suitable number of power straps may be used. The number of power straps may be determined based on power consumption of various Circuit Cells 206, as well as by a desired operating voltage range of Circuit Block 205. In a semiconductor IC fabrication process, Power Straps 213 may be implemented as wires in one or more metal layers.

Gate 207 includes two types of switches, Switches 208 and Switches 209. In the illustrated embodiment, both Switches 208 and 209 are shown as P-channel MOSFETs, although any suitable type of transconductance device may be used. Switches 208 are illustrated as being larger than Switches 209 in order to indicate different physical characteristics between the two groups of switches. In some embodiments, the physical characteristic may correspond to channel lengths of the MOSFETs. Switches 208 may correspond to MOSFETs with longer channel lengths than Switches 209. The longer channel lengths may result in less leakage through Switches 208 when isolation signal 214 is asserted as compared to Switches 209. Switches 209, in such an embodiment, may have lower $R_{on}$, particularly at lower operating voltages.

In other embodiments, the physical characteristic may correspond to voltage thresholds of the MOSFETs. Switches 208 may correspond to standard voltage threshold (SVT) MOSFETs with voltage thresholds that are within a middle range of MOSFET voltage thresholds for a given CMOS semiconductor process. Switches 209 may correspond to low voltage threshold (LVT) MOSFETs, with voltage thresholds that are less than SVT MOSFETs. SVT MOSFETs, similar to longer channel length MOSFETs, may result in less leakage through Switches 208 when isolation signal 214 is asserted, while LVT MOSFETs may result in Switches 209 having lower $R_{on}$. In some embodiments, high voltage threshold (HVT) MOSFETs may also be utilized, in which the voltage threshold is greater than the voltage threshold of an SVT MOSFET. Other physical characteristics may be changed between Switches 208 and Switches 209, including, for example, varying channel widths and/or channel lengths. In some embodiments, a combination of physical characteristics may be varied between Switches 208 and 209.

Switches 209, in the illustrated embodiment, allow more current to pass at lower operating voltages. Circuit Cells 206b, may, therefore, have a lower resistance path to global power signal 210 at lower operating voltages than Circuit Cells 206a. Power Straps 213 may, therefore, help reduce resistance in the path to global power signal 210 for Circuit Cells 206a at these lower operating voltages. In some embodiments, Switches 209, when combined with an adequate number of Power Straps 213, may be capable of providing sufficient power to Circuit Cells 206b, as well as to Circuit Cells 206a, when a voltage level of global power signal 210 is below a voltage threshold of Switches 208.

Although Switches 208 and 209 are shown alternating between each row of Circuit Cells 206, distribution of each type of switch may be determined by various performance considerations. For example, the various rows of Circuit Cells 206 may be evaluated for power consumption when operating, leakage current when idle, minimum operating voltage levels, percentage idle time when Circuit Block 205 is active, and other similar considerations. In some IC designs, a ratio of the number of Switches 208 to the number of Switches 209 may be fixed for multiple circuit blocks. For example, a given IC design may utilize three SVT MOSFETs for each LVT MOSFET for each power gate in the IC. In another embodiment, each circuit block may be analyzed independently and the ratio of SVT to LVT MOSFETs adjusted accordingly. Other embodiments may utilize a combination of fixed ratios and adjusted ratios depending on relative sizes, voltage ranges, or other factors that determine performance requirements of various circuit blocks.

Although the embodiment of System 200 shows Gate 207 coupled between a global power signal and a local power signal, in other embodiments, the power gate may be included between a local ground reference and a global ground reference, either in addition to, or in place of Gate 207. In such embodiments, n-channel MOSFETS, for example, may be used.

It is noted that the embodiment of system 200 as illustrated in FIG. 2 is merely an example. The illustration of FIG. 2 has been simplified to highlight features relevant to this disclosure. In other embodiments, additional rows of Circuit Cells 206 may be included. Various embodiments may include any number of Switches 208 and Switches 209. In some embodiments, more than one row of Circuit Cells 206 may be coupled to a given Switch 208 or Switch 209. In other embodiments, more than one Switch 208 or Switch 209 may be coupled to a given row of Circuit Cells 206.

Figure 3:
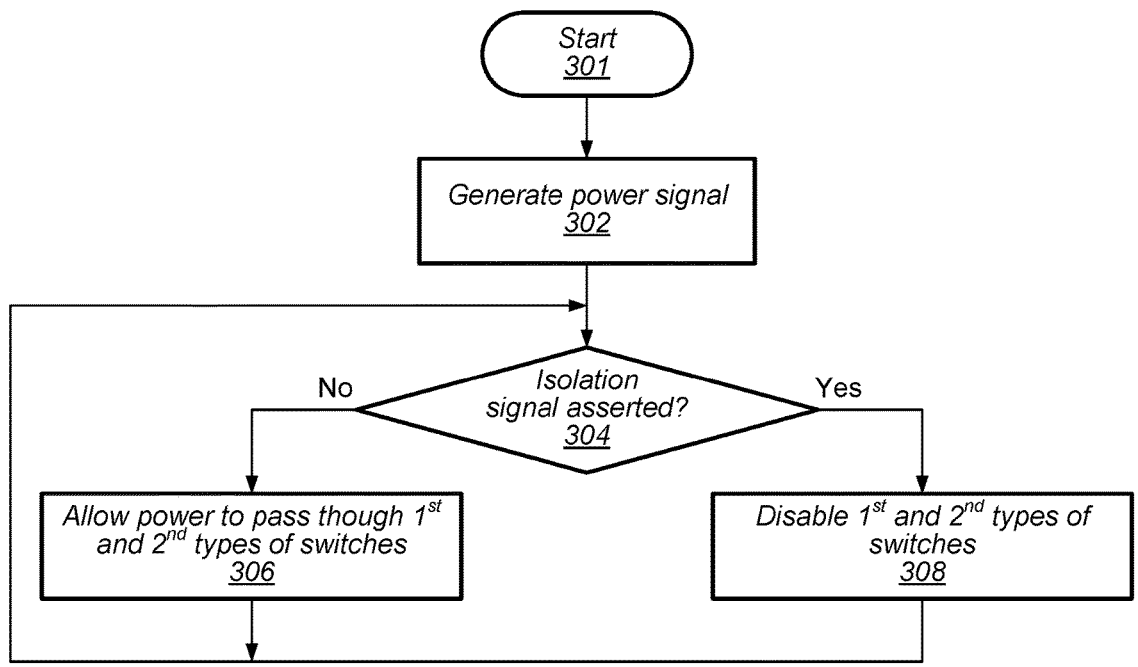
FIG. 3 depicts a flowchart of an embodiment of a method for implementing a power gating scheme.

Moving to FIG. 3, an embodiment of a method for implementing a power gating scheme is depicted. Method 300 may be applicable to power gating system such as shown in FIG. 1 or FIG. 2. Referring collectively to FIG. 1, FIG. 2, and FIG. 3, Method 300 begins in block 301.

A power signal is generated (block 302). In the illustrated embodiment, Power Supply 101 generates global power signal 110. Global power signal 110 may provide power to multiple circuits, such as Circuit Blocks 105a-105c. Each of Circuit Blocks 105a-105c is coupled to global power signal 110 via Gates 107a-107c.

Further operations of Method 300 may depend on a state of an isolation signal (block 304). PMU 103 may assert one or more of isolation signals 114a-114c. An assertion of one of isolation signals 114a-114c may be in response to a signal received by PMU 103 from another circuit in System 100 or may be in response to PMU 103 detecting an idle state of one or more of Circuit Blocks 105a-105c. Referring to System 200, if isolation signal 214 is de-asserted, then the method moves to block 306 to set Gate 207 to allow power to pass to Circuit Block 205. Otherwise, if isolation signal 214 is asserted, then the method moves to block 308 to set Gate 207 to block power to Circuit Block 205.

If the isolation signal is de-asserted, then Switches 208 and 209 are enabled, allowing current to pass (block 306). If isolation signal 214 is de-asserted, then Switches 208 and 209 are enabled and allow current to flow to Circuit Cells 206a and 206b. In some embodiments, Switches 208 may correspond to SVT MOSFETs while Switches 209 may correspond to LVT MOSFETs with lower voltage thresholds than the SVT MOSFETs. At higher voltage levels of global power signal 110, the $R_{on}$ of the LVT MOSFETs and the SVT MOSFETs may be similar, allowing adequate current to power Circuit Cells 206a and 206b. At lower voltage levels of global power signal 110, the $R_{on}$ of the LVT MOSFETs may be less than the SVT MOSFETs. The LVT MOSFETs included in Switches 209, may, in such cases, provide more current per switch than the SVT MOSFETs included in Switches 208. Power Straps 213 may aid in distributing the current throughout Circuit Block 205. In some cases, the voltage level of global power signal 210 may be below the voltage threshold of the SVT MOSFETs, but higher than the voltage threshold of the LVT MOSFETs. Circuit Cells 206a and 206b may consume less current at lower voltage levels, such that, if enough LVT MOSFETs are included in Switches 209, Circuit Block 205 may receive enough current via Switches 209 to operate.

If the isolation signal is asserted, then Switches 208 and 209 are disabled (block 308). In the illustrated embodiment, if isolation signal 214 is de-asserted, then Switches 208 and 209 are disabled, thereby blocking current to Circuit Cells 206a and 206b. LVT MOSFETs included in Switches 209 may allow more current to leak through to Circuit Block 205 than SVT MOSFETs included in Switches 208, resulting in some power consumption by Circuit Block 205 despite Circuit Block 205 being disabled or idle.

It is noted that by selecting an appropriate number of Switches 208 versus the number of Switches 209, a suitable balance may be achieved between low voltage performance while Circuit Block 205 is active and leakage current while Circuit Block 205 is disabled. Although SVT and LVT MOSFETs are used in the illustrated embodiment, other characteristics of MOSFETs may be changed in addition to or instead of voltage thresholds, such as, for example, transistor channel lengths.

It is also noted that method 300 illustrated in FIG. 3 is merely an example embodiment. In other embodiments, method 300 may include one or more addition operations. Although the embodiment of System 200 includes two types of switches, more than two types may be included in other embodiments, such as, for example, HVT MOSFETs in addition to SVT and LVT MOSFETs. Other physical characteristics may be changed between Switches 208 and Switches 209, including, for example, varying channel widths, channel lengths, or any suitable combination of channel lengths, channel widths, and voltage thresholds.

Figure 4:
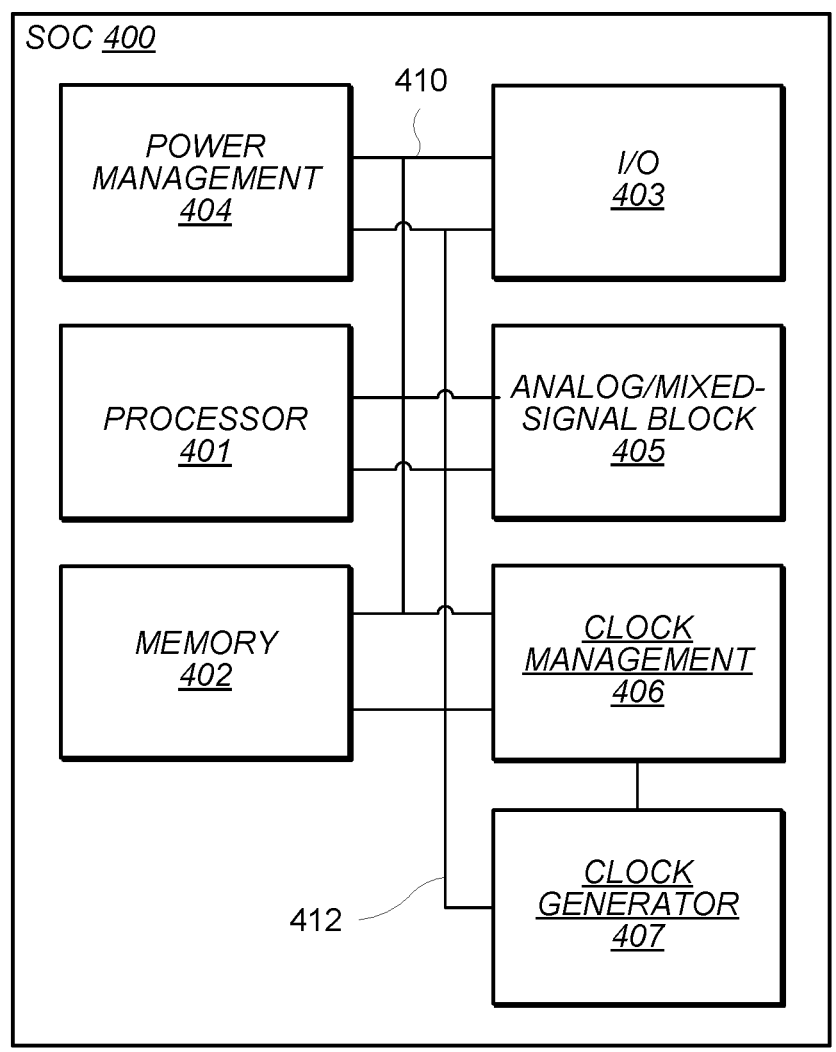
FIG. 4 illustrates a block diagram of an embodiment of a system-on-a-chip (SoC).

Turning now to FIG. 4, a block diagram of an embodiment of a system-on-a-chip (SoC) is illustrated. SoC 400 may, in some embodiments, include System 100 of FIG. 1. In the illustrated embodiment, SoC 400 includes a Processor 401 coupled to Memory Block 402, I/O Block 403, Power Management Unit 404, Analog/Mixed-Signal Block 405, Clock Management Unit 406, all coupled through bus 410. SoC 400 also includes clock generator 407, coupled to the other functional blocks through clock signals 412. In some embodiments, Power Management Unit 404 may correspond to PMU 103 in FIG. 1. Additionally, any of Processor 401, Memory 402, I/O Block 403, Analog/Mixed-Signal Block 405, and Clock Management Unit 406, may correspond to Circuit Blocks 105a-105c. In various embodiments, SoC 400 may be configured for use in a mobile computing application such as, e.g., a tablet computer or smartphone.

Processor 401 may, in various embodiments, be representative of a general-purpose processor that performs computational operations. For example, Processor 401 may be a central processing unit (CPU) such as a microprocessor, a microcontroller, an application-specific integrated circuit (ASIC), or a field-programmable gate array (FPGA). In some embodiments, Processor 401 may include multiple processors or CPU cores and may include one or more register files and memories.

In various embodiments, Processor 401 may implement any suitable instruction set architecture (ISA), such as, e.g., PowerPC™, or x86 ISAs, or combination thereof. Processor 401 may include one or more bus transceiver units that allow Processor 401 to communication to other functional blocks within SoC 400 such as, Memory Block 402, for example.

Memory Block 402 may include any suitable type of memory such as, for example, a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), resistive RAM (RRAM or ReRAM), or a Magnetoresistive Random Access Memory (MRAM), for example. Some embodiments may include a single memory, such as Memory Block 402 and other embodiments may include more than two memory blocks (not shown). In some embodiments, Memory Block 402 may be configured to store program instructions that may be executed by Processor 401. Memory Block 402 may, in other embodiments, be configured to store data to be processed, such as graphics data, for example.

I/O Block 403 may be configured to coordinate data transfer between SoC 400 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O Block 403 may be configured to implement a version of Universal Serial Bus (USB) protocol, IEEE 1394 (Firewire®) protocol, or, and may allow for program code and/or program instructions to be transferred from a peripheral storage device for execution by Processor 401. In one embodiment, I/O Block 403 may be configured to perform the data processing necessary to implement an Ethernet (IEEE 802.3) networking standard.

Power Management Unit 404 may be configured to manage power delivery to some or all of the circuit blocks included in SoC 400. Power Management Unit 404 may comprise sub-blocks for managing multiple power supplies for various functional blocks. In various embodiments, the power supplies may be located in Analog/Mixed-Signal Block 405, in Power Management Unit 404, in other blocks within SoC 400, or come from external to SoC 400, coupled through power supply pins. Power Management Unit 404 may include one or more voltage regulators to adjust outputs of the power supplies to various voltage levels as required by functional blocks within SoC 400.

Power Management Unit 404 may further include logic for asserting and de-asserting one or more isolation signals. Each isolation signal may be coupled to one or more power gate circuits, such as, e.g., Gates 107a-107c in FIG. 1. These isolation signals may be asserted to disable power from a respective circuit block during idle periods or in response to SoC 400 entering a reduced power mode.

Analog/Mixed-Signal Block 405 may include a variety of circuits including, for example, a crystal oscillator, a phase-locked loop (PLL) or frequency-locked loop (FLL), an analog-to-digital converter (ADC), and a digital-to-analog converter (DAC) (all not shown). In some embodiments, Analog/Mixed-Signal Block 405 may also include, in some embodiments, radio frequency (RF) circuits that may be configured for operation with cellular telephone networks. Analog/Mixed-Signal Block 405 may include one or more voltage regulators to supply one or more voltages to various functional blocks and circuits within those blocks.

Clock Management Unit 406 may be configured to enable, configure and manage outputs of one or more clock sources, such as, for example clock generator 407. In various embodiments, the clock sources may be located in Analog/Mixed-Signal Block 405, in Clock Management Unit 406, in other blocks with SoC 400, or come from external to SoC 400, coupled through one or more I/O pins. In some embodiments, Clock Management Unit 406 may be capable of enabling and disabling (i.e. gating) a selected clock source before it is distributed throughout SoC 400. Clock Management Unit 406 may include registers for selecting an output frequency of a PLL, FLL, or other type of adjustable clock source.

SoC 400 may also include clock generator 407. Clock generator 407 may be a sub-module of analog/mixed signal block 405 or Clock Management Unit 406. In other embodiments, clock generator 407 may be a separate module within SoC 400. One or more clock sources may be included in clock generator 407. In some embodiments, clock generator 407 may include PLLs, FLLs, internal oscillators, oscillator circuits for external crystals, etc. Clock generator 407 may output one or more clock signals 412 to the functional blocks of SoC 400. One or more of functional blocks may be capable of locally gating one or more clock signal outputs 412 to enable or disable propagation of a given clock signal 412 within the one or more functional blocks.

System bus 410 may be configured as one or more buses to couple Processor 401 to the other functional blocks within the SoC 400 such as, e.g., Memory Block 402, and I/O Block 403. In some embodiments, system bus 410 may include interfaces coupled to one or more of the functional blocks that allow a particular functional block to communicate through the bus. In some embodiments, system bus 410 may allow movement of data and transactions (i.e., requests and responses) between functional blocks without intervention from Processor 401. For example, data received through the I/O Block 403 may be stored directly to Memory Block 402.

It is noted that the SoC illustrated in FIG. 4 is merely an example. In other embodiments, different functional blocks and different configurations of functions blocks may be possible dependent upon the specific application for which the SoC is intended. It is further noted that the various functional blocks illustrated in SoC 400 may operate at different clock frequencies.

Figure 5:
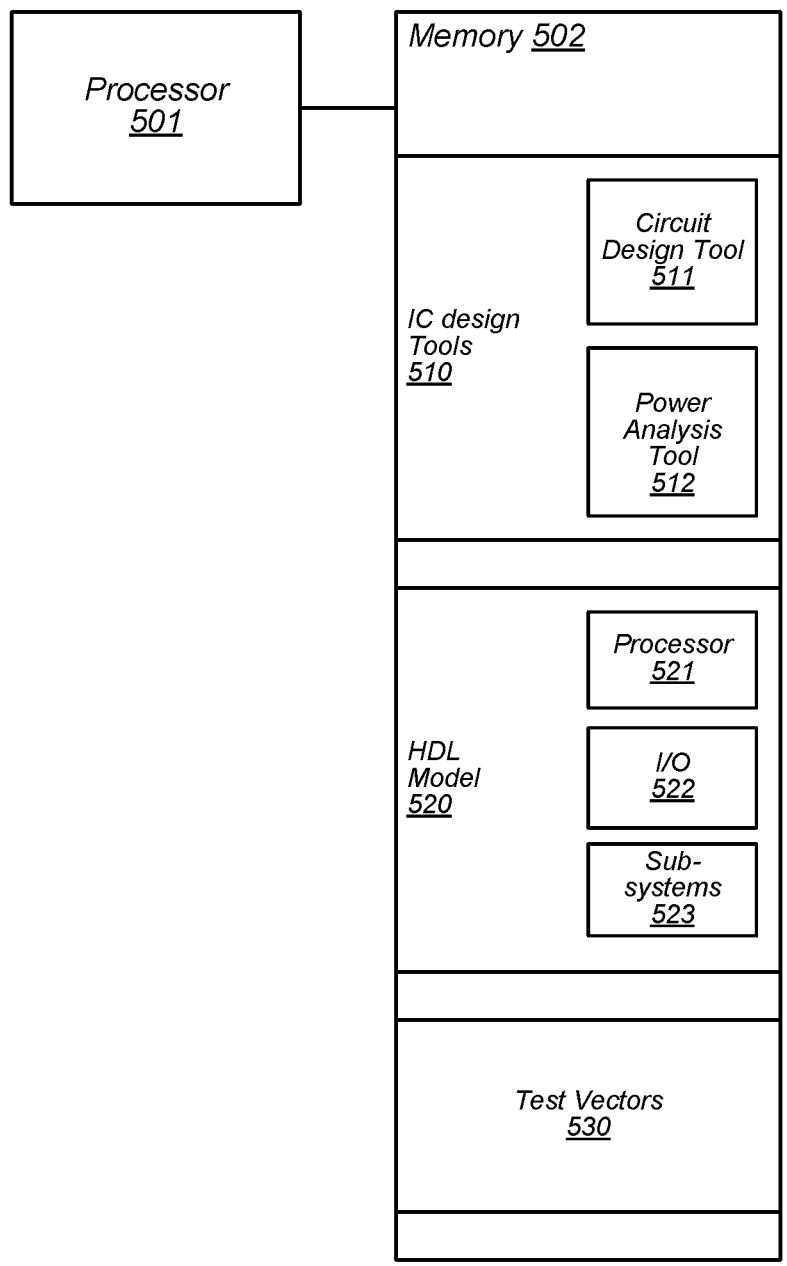
FIG. 5 illustrates a block diagram of an embodiment of a system for designing integrated circuits.

Moving now to FIG. 5, a block diagram of an embodiment of a system for designing integrated circuits is illustrated. System 500 includes a computing system that may be utilized for designing integrated circuits, such as SoC 100 in FIG. 1. More specifically, system 500 includes integrated circuit design software usable to define integrated circuitry for implementing power gating circuits such as shown in FIG. 1 and FIG. 2. System 500 may include processor 501 coupled to memory 502. Memory 502 may store software programs, including integrated circuit (IC) design tools 510. Memory 502 may also store hardware description language (HDL) model 520 and test vectors 530.

Processor 501 may include one or more processors or cores which may read and execute instructions included in software programs stored in memory 502, such as IC design tools 510. In some embodiments, system 500 may include more than one processor 501. In a multi-processor system, the processors may be included in a single enclosure and/or in multiple enclosures coupled by a network. Processor 501 may read instructions included in the software programs of IC design tools 510.

Memory 502 may include any suitable type of memory such as, for example, Dynamic Random Access Memory (DRAM) or Static Random Access Memory (SRAM). Memory 502 may store IC design tools 510, which may be a software program suite that includes one or more software programs for designing integrated circuitry. IC design tools 510 may include programs such as circuit design tool 511 and power analysis tool 512. Additional programs for designing an integrated circuit may also be included in IC design tools. Each program included in IC design tools may be from a single software vendor or programs may be from a variety of vendors. IC design tools 510 may be copied into memory 502, by processor 501 for example, from a non-transitory computer-accessible storage medium, which may include a hard-disk drive, an optical disk drive, a solid-state drive, or any other suitable type of non-volatile storage.

Memory 502 may also store HDL Model 520, which may further include one or more models of functional blocks, such as Processor Model 521, I/O Model 522, and various Sub-Systems 523. Sub-Systems 523 may include models for one or more functional circuits, such as, e.g., I/O Block 403, Analog/Mixed-Signal Block 405, and Clock Management Unit 406, described in FIG. 4. One or all of Sub-Systems 523 may include a power gating function to disable the particular functional circuit when idle or the IC is enters a reduced power state. HDL Model 520 may include all features of an integrated circuit, such as SoC 100, or may only include portions of the integrated circuit. Test vectors 530 may also be stored in memory 502 and may include a variety stimulus values for driving inputs and compare values for determining expected output values. Dependent upon execution of the instructions included in IC design tools 510, processor 501 may apply test vectors 530 to HDL Model 520. HDL Model 520 and test vectors 530 may also be stored and read from the non-transitory computer-accessible storage medium.

It is noted that FIG. 5 is merely an example of an IC design system. Various blocks have been omitted for clarity. In other embodiments, a different number of blocks may be included and the blocks may be arranged differently.

Figure 6:
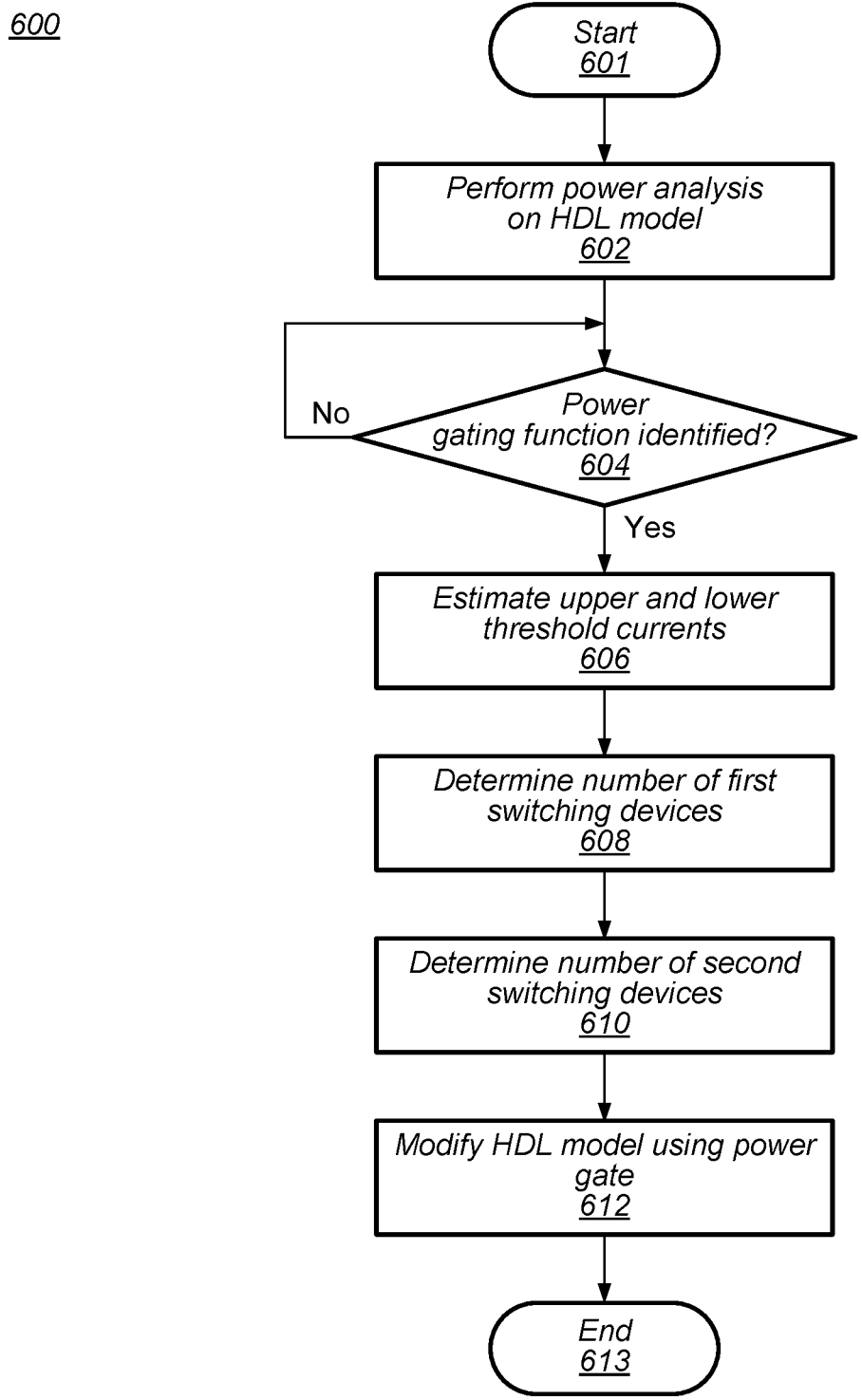
FIG. 6 illustrates a flowchart of an embodiment of a method for implementing a power gating circuit in an integrated circuit design.

Turning to FIG. 6, an embodiment of a method is illustrated for implementing a power gating circuit in an integrated circuit design. Method 600 may be used for implementing power gating circuits such as, e.g., the systems in FIG. 1 and FIG. 2. Method 600 may be performed by System 500 in FIG. 5 on an HDL model such as, e.g., HDL Model 520. Referring collectively to FIG. 2, FIG. 5, and the flowchart in FIG. 6, the method may begin in block 601.

Power analysis is performed on an HDL model (block 602). In the illustrated embodiment, Processor 501 executes one or more of the IC Design Tools 510 in Memory 502, including Power Analysis Tool 512. Processor 501 uses Power Analysis Tool 512 to evaluate power usage on HDL Model 520. Power Analysis Tool 512 may perform various analysis related to power consumption and power distribution in HDL Model 520, including estimating an amount of current consumed by various circuit models included in a simulation using HDL Model 520.

Proceeding operations of Method 600 may be dependent on identification of a power gating function (block 604). In some embodiments, a power gating function may be included in a circuit model in HDL Model 520. For example, one or more circuit models included in Sub-Systems 523 may include a power gating circuit. Processor Model 521 may also include a power gating circuit. If a power gating circuit is not identified in a current point in the simulation of HDL Model 520, than the method remains in block 604. Otherwise, for each power gate identified, the method moves to block 606 to determine threshold currents.

If a power gating circuit is identified, then an upper and a lower threshold current are determined (block 606). IC Design Tools 510 may identify a power gating circuit, such as, for example, Gate 207 in System 200. Using Power Analysis Tool 512 may be used to estimate current consumption of Circuit Block 205 for various voltage levels of power supply signal 210 and for various operating conditions of Circuit Block 205. Power Analysis Tools 512 may further provide current consumption estimates for portions of Circuit Block 205, such as, e.g., Circuit Cells 206a and for Circuit Cells 206b. Upper and lower threshold values may be estimated for Circuit Block 205 and/or a respective upper and lower threshold value may be estimated for each of Circuit Cells 206a and 206b. The upper threshold values may correspond to a highest projected level of activity for Circuit Block 205 based on expected operations performed by Circuit Block 205, or based on a theoretical maximum level activity of all Circuit Cells 206 independent of expected operations performed by Circuit Block 205. The lower threshold value may correspond to a lowest projected activity level for Circuit Block 205 based on one or more possible idle states of Circuit Block 205. The upper and lower threshold values may indicate peak estimated values, or may be determined as an average of multiple values over a period of time.

A first number of a first type of switching devices is determined (block 608). In the illustrated embodiment, the first type of switching devices correspond to Switches 209, which may include LVT MOSFETs, short channel MOSFETs, or other type of switching device that meets a low voltage $R_{on}$ requirement for Circuit Block 205. The first number corresponds to a number of Switches 208 to be used to provide an adequate amount of current to Circuit Block 205 to meet the previously estimated upper threshold value. In some embodiments, more than one upper threshold value may be used to determine the number of Switches 209, such as, for example, an upper threshold value corresponding to a highest operating voltage for Circuit Block 205, as well as an upper threshold value corresponding to a lowest operating voltage. The number of Switches 209 may be selected to meet each upper threshold values.

A second number of switching devices is determined (block 610). The second type of switching devices, in the illustrated embodiment, corresponds to Switches 208. Switches 208 may include SVT MOSFETs, long channel MOSFETs or other type of switching devices that meet a current leakage requirement for Circuit Block 205. In some embodiments, the number of Switches 208 may be determined based on a fixed ratio of Switches 208 to Switches 209, such as, for example, one Switch 208 for every three Switches 209. In other embodiments, the number of Switches 208 may be based at least one lower threshold value. In various embodiments, the number of Switches 208 may be added to the number of Switches 209, or may replace a similar number of Switches 209. It is noted that use of Switches 208 may reduce a leakage current in Circuit Block 205 compared to using only Switches 209.

HDL model 520 is modified to include Gate 207 (block 612). Using IC Design Tools 510, Gate 207 is implemented in HDL Model 520, coupled to Circuit Block 205. In some embodiments, if threshold values are available for each of Circuit Cells 206a and 206b, then the threshold values may be used to determine if each of Circuit Cells 206a and 206b are coupled to Switches 208 or Switches 209. The method ends in block 613.

It is noted that method 600 illustrated in FIG. 6 is merely an example embodiment. In other embodiments, method 600 may include one or more addition operations. Method 600 is described in combination with system 400 in FIG. 4. In various other embodiments however, method 600 may be applied to alternative systems with more or fewer power gating functions. It is also noted that the method illustrated in FIG. 6 may be implemented using software, i.e., program instruction stored in a non-transitory machine-readable storage medium, which when executed on a computing system including one or more processors, performs the disclosed operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a circuit block coupled to a local power node, wherein the circuit block includes a plurality of rows of circuit cells; and
   a power gating circuit coupled between the local power node and a global power supply, wherein the power gating circuit is configured to isolate the local power node from the global power supply based on an isolation signal, and wherein the power gating circuit includes:
      a first plurality of first switching devices that have a first threshold voltage; and
      a second plurality of second switching devices that have a second threshold voltage, different from the first threshold voltage;

wherein the first plurality of first switching devices and the second plurality of second switching devices are coupled to respective ones of a plurality of wires, each wire conducting power to a corresponding row of the plurality of rows of circuit cells;

a first power strap coupled to the plurality of wires; and a second power strap coupled to the plurality of wires, wherein at least a portion of the circuit cells in each of the plurality of rows is between the first power strap and the second power strap.

2. The apparatus of claim 1, wherein the second threshold voltage is greater than the first threshold voltage.

3. The apparatus of claim 2, wherein the power gating circuit is configured to operate when a voltage level of the global power supply is less than the second threshold voltage.

4. The apparatus of claim 1, wherein the first plurality of first switching devices includes at least one p-channel metal-oxide semiconductor field-effect transistor (MOSFET), with the first threshold voltage, and the second plurality of second switching devices includes at least another p-channel MOSFET with the second threshold voltage.

5. The apparatus of claim 1, wherein the first plurality of first switching devices includes at least one p-channel metal-oxide semiconductor field-effect transistors (MOSFET) with a first channel length, and the second plurality of second switching devices includes at least another p-channel MOSFET with a second channel length, greater than the first channel length.

6. The apparatus of claim 1, wherein the first power strap is coupled to each of the first plurality of first switching devices and to each of the second plurality of second switching devices using at least one wire in a metal layer of an integrated circuit.

7. The apparatus of claim 1, wherein a number of the second plurality of second switching devices is greater than a number of the first plurality of first switching devices.

8. A method, comprising:
performing, by a computing system, a power analysis of a hardware description language (HDL) model of an integrated circuit, wherein the HDL model is stored in a memory of a computer system;
identifying, by the computing system, a power gating function for a circuit block included in the HDL model;
determining, by the computing system, an upper threshold amount of current and a lower threshold amount of current used by the circuit block;
determining, by the computing system, a number of first switching devices included in a power gating circuit based on the upper threshold amount of current and a number of rows of circuit cells included in the circuit block;
determining, by the computing system, a number of second switching devices included in the power gating circuit based on the lower threshold amount of current and the number of rows of circuit cells;
determining, by the computing system, a number of power straps included in the power gating circuit based on an operating voltage range;
modifying, by the computing system, the HDL model by:
inserting the first and second switching devices between a global power supply node and respective ones of a plurality of wires each wire conducting power to a corresponding row of the number of rows of circuit cells;
coupling a first power strap of the number of power straps to the plurality of wires; and
coupling a second power strap of the number of power straps to the plurality of wires, wherein at least a portion of the circuit cells in each of the number of rows is between the first power strap and the second power strap; and
fabricating the integrated circuit based on the HDL model.

9. The method of claim 8, wherein determining the upper threshold amount of current used by the circuit block includes determining an amount of current used by the circuit block during operation of the circuit block.

10. The method of claim 8, wherein determining the upper threshold amount of current used by the circuit block includes determining an amount of current used by the circuit block in an idle state.

11. The method of claim 8, wherein the number of first switching devices includes at least one p-channel metal-oxide semiconductor field-effect transistor (MOSFET), with a first voltage threshold, and the number of second switching devices includes at least another p-channel MOSFET with a second voltage threshold, greater than the first voltage threshold.

12. The method of claim 11, further comprising providing power to the circuit block when a voltage level of the global power supply node is less than the second voltage threshold.

13. The method of claim 8, wherein the number of first switching devices includes at least one p-channel metal-oxide semiconductor field-effect transistor (MOSFET), with a first channel length, and the number of second switching devices includes at least another p-channel MOSFET with a second channel length, longer than the first channel length.

14. The method of claim 8, wherein modifying the HDL model dependent upon the power gating circuit comprises coupling an output of one or more of the number of first switching devices to an output of one or more of the number of second switching devices using a wire in a metal layer of the integrated circuit.

15. A system comprising:
a power supply circuit configured to generate a power signal and a ground reference;
a power management circuit configured to assert one or more isolation signals;
a plurality of power gating circuits; and
a plurality of circuit blocks, wherein a particular circuit block includes a plurality of rows of circuit cells;
wherein a particular power gating circuit of the plurality of power gating circuits is coupled between the particular circuit block and the ground reference, and is configured to isolate the respective circuit block from the ground reference in response to an assertion of a particular one of the one or more isolation signals, and wherein the particular power gating circuit includes:
a first plurality of first switching devices that have a first threshold voltage;
a second plurality of second switching devices that have a second threshold voltage, different from the first threshold voltage;
wherein the first plurality of first switching devices and the second plurality of second switching devices are coupled to respective ones of a plurality of wires, each wire conducting power to a corresponding row of the plurality of rows of circuit cells;
a first power strap coupled to the a plurality of wires; and
a second power strap coupled to the plurality of wires, wherein at least a portion of the circuit cells in the plurality of rows is between the first power strap and the second power strap.

16. The system of claim 15, wherein the second threshold voltage is greater than the first threshold voltage.

17. The system of claim 16, wherein the power gating circuit is configured to operate when a voltage level of the power signal is less than the second threshold voltage.

18. The system of claim 15, wherein the first plurality of first switching devices includes at least one n-channel metal-oxide semiconductor field-effect transistor (MOSFET), with the first threshold voltage, and the second plurality of second switching devices includes at least another n-channel MOSFET with the second threshold voltage.

19. The system of claim 15, wherein the first plurality of first switching devices includes at least one n-channel metal-oxide semiconductor field-effect transistors (MOSFET) with a first channel length, and the second plurality of second switching devices includes at least another n-channel MOSFET with a second channel length, greater than the first channel length.

20. The system of claim 15, wherein a number of the second plurality of second switching devices is greater than a number of the first plurality of first switching devices.

\* \* \* \* \*